United States Patent
Meier et al.

(10) Patent No.: US 12,090,432 B2
(45) Date of Patent: Sep. 17, 2024

(54) FILTER MEDIUM

(71) Applicant: JOHNS MANVILLE, Denver, CO (US)

(72) Inventors: Joerg Meier, Grossaitingen (DE); Joerg Lehnert, Schwabmuenchen (DE)

(73) Assignee: Johns Manville, Denver, CO (US)

( * ) Notice: Subject to any disclaimer, the term of this patent is extended or adjusted under 35 U.S.C. 154(b) by 1147 days.

(21) Appl. No.: 14/132,742

(22) Filed: Dec. 18, 2013

(65) Prior Publication Data

US 2014/0174934 A1    Jun. 26, 2014

(30) Foreign Application Priority Data

Dec. 20, 2012   (DE) ............ 10 2012 025 023.1

(51) Int. Cl.
*B01D 39/16*    (2006.01)
*B01D 39/20*    (2006.01)
*D04H 1/485*   (2012.01)

(52) U.S. Cl.
CPC ..... *B01D 39/1623* (2013.01); *B01D 39/2017* (2013.01); *D04H 1/485* (2013.01); *B01D 2239/0659* (2013.01); *B01D 2239/10* (2013.01); *B01D 2239/1233* (2013.01); *B01D 2239/1258* (2013.01); *B01D 2239/1291* (2013.01)

(58) Field of Classification Search
CPC  B01D 39/1623; B01D 30/2017; B01D 35/30; B01D 2239/0627; B01D 2239/0659; D04H 3/105; D04H 1/485; D04H 3/102; D04H 13/005; D04H 13/007; B32B 2250/02; B32B 2250/03; B32B 2255/02; B32B 2262/0276; B32B 2305/20; B32B 2307/21; B32B 2307/724; B32B 2327/18
USPC ................................. 442/401, 402; 428/212
See application file for complete search history.

(56) References Cited

U.S. PATENT DOCUMENTS

| | | | | |
|---|---|---|---|---|
| 3,853,651 | A * | 12/1974 | Porte .................. | D04H 3/011 156/148 |
| 4,211,661 | A * | 7/1980 | Perry ................. | B01D 39/1623 210/491 |
| 4,582,750 | A * | 4/1986 | Lou .................... | D04H 1/48 156/148 |
| 5,397,632 | A * | 3/1995 | Murphy, Jr. ....... | B01D 39/1623 428/102 |

(Continued)

FOREIGN PATENT DOCUMENTS

| | | | |
|---|---|---|---|
| DE | 102007027299 A1 * | 12/2008 | ......... B01D 39/1623 |
| EP | 0 446 822 A1 | 3/1991 | |

(Continued)

OTHER PUBLICATIONS

DE 102007027299 Enlgish Machine Translation. Retrieved from Espacenet on May 26, 2016.*

(Continued)

*Primary Examiner* — Jennifer A Gillett
(74) *Attorney, Agent, or Firm* — Robert D. Touslee (57) ABSTRACT

The present invention relates to a filter medium, a method for the manufacture thereof and the use of the filter medium according to the invention. The filter medium according to the invention comprises at least two textile nonwoven layers which are joined to one another by needling. The needled composite is then subjected to an after treatment so that the holes present from the needling are reduced by at least 50%.

17 Claims, 2 Drawing Sheets

(56) References Cited

U.S. PATENT DOCUMENTS

| | | | | |
|---|---|---|---|---|
| 5,401,446 | A * | 3/1995 | Tsai | B01D 39/1615 204/165 |
| 5,503,745 | A * | 4/1996 | Ogata | B01D 39/08 210/490 |
| 5,709,735 | A * | 1/1998 | Midkiff | B01D 39/1623 210/505 |
| 5,714,067 | A * | 2/1998 | Sorrick | B01D 39/1623 210/490 |
| 5,730,923 | A * | 3/1998 | Hassenboehler, Jr. | D04H 1/54 264/241 |
| 5,993,501 | A | 11/1999 | Cusick et al. | |
| 6,034,008 | A * | 3/2000 | Lim | D04H 1/724 442/334 |
| 6,114,262 | A * | 9/2000 | Groh | D04H 1/435 428/297.4 |
| 6,387,141 | B1 | 5/2002 | Hollingsworth et al. | |
| 6,991,113 | B2 * | 1/2006 | Nakajima | B01D 39/163 156/148 |
| 2004/0118765 | A1 * | 6/2004 | Yavorsky | B01D 39/1623 210/290 |
| 2005/0284823 | A1 * | 12/2005 | Fall | B01D 29/21 210/767 |
| 2006/0172639 | A1 * | 8/2006 | Yamada | B01D 39/1623 442/59 |
| 2008/0274312 | A1 * | 11/2008 | Schelling | B01D 39/083 428/34.5 |
| 2008/0302072 | A1 | 12/2008 | Hassmann et al. | |
| 2010/0107881 | A1 * | 5/2010 | Healey | B01D 39/1623 96/11 |
| 2010/0236202 | A1 * | 9/2010 | Gutsche | B01D 39/086 55/382 |
| 2010/0282682 | A1 * | 11/2010 | Eaton | B01D 39/04 210/650 |
| 2010/0307338 | A1 * | 12/2010 | Hassman | B01D 39/163 95/273 |
| 2011/0016839 | A1 * | 1/2011 | Duello | B01D 39/163 55/524 |

FOREIGN PATENT DOCUMENTS

| | | |
|---|---|---|
| EP | 0 590 629 A2 | 9/1993 |
| EP | 0878226 A | 11/1998 |
| EP | 0 993 854 A1 | 4/2000 |
| EP | 1 134 013 A1 | 9/2001 |
| EP | 1656981 A1 | 5/2006 |

OTHER PUBLICATIONS

Mohamed, M. and E. Afify. Efficient Use of Fibrous Structures in Filtration. EPA 600/2-76-2004, Jul. 1974. p. 115 and 116.*
Ahlstrom's Francesca Montefusco, The use of Nonwovens in air filtration, Filtration & Separation, vol. 42, Issue 2, 2005, p. 30-31.*
PET (Polyethylene Terephthalate), The Association of Plastic Recyclers, https://plasticrecycling.org/pet-design-guides, retrieved Jun. 20, 2020.*

* cited by examiner

FILTER MEDIUM

BACKGROUND OF THE INVENTION

The present invention relates to a filter medium, a method for the manufacture thereof and the use of the filter medium according to the invention.

The use of filters, in particular multilayer filter media has been known for a long time. Thus, for example, air filters have been used for a long time in the automobile sector, in air conditioning systems, interior filters, pollen filters, clean room filters, household filters etc. Filters have also been used for a long time for the treatment of liquid media. Examples of this are oil filters and fuel filters or filters for water preparation.

BRIEF SUMMARY OF THE INVENTION

Depending on the area of application, the filters are adapted to achieve a sufficient filtration efficiency and service life. Thus particulate air filters for general ventilation technology (in accordance with EN 779) are used as coarse, medium and fine filters whereas suspended material filters are used in the EPA and HEPA (air) or water preparation areas.

Known from U.S. Pat. No. 5,993,501 are multilayer filter media and filters which consist of a stiff, pleatable base layer, the actual filter layer and a cover. These filters are particularly well suited for gas (air) and liquid filtration.

Known from EP-A-1134013 are multilayer pleated filter media and filters which consist of a stiff, pleatable base layer, the actual filter layer and a cover. These filters are constructed of polymeric hot-melt-binder consolidated microfibres and are already well-suited for gas (air) and liquid filtration.

Known from EP-A-0878226 are multilayer filter media and filters which are constructed from fine polymer and glass fibres. These filters are particularly well suited for gas (air) and liquid filtration.

Known from EP-A-1656981 are filter media and filters constructed from fine glass fibres. These filters are particularly well suited for gas (air) and liquid filtration.

In air supply systems with large volume flows relative to the surface of the filter medium it is necessary to reliably purify the air flows present so that a good air quality is ensured.

Known from EP-A-0993854 are filter media and filters in which the filter media are consolidated by means of water jet needling. The filter media claimed in EP-A-0993854 have so-called split fibres in order to ensure a sufficient separation of small particles. Furthermore, EP-A-0993854 mentions the problems or disadvantage of consolidation by needling due to the needle holes formed on the clean air side and their influence on the filter efficiency for small particles. The solution proposed in EP-A-0993854 by combining water jet needling and split fibres can however only be achieved in a complex manner and is correspondingly expensive.

There is therefore always a need for filter media which are suitable for use in particular as air filters in internal combustion engines without the filter media comprising split fibres.

The preceding objects as well as other implicitly present objects are solved by a filter medium according to the present invention.

DETAILED DESCRIPTION OF THE INVENTION

The subject matter of the present invention is therefore a filter medium comprising:

a) at least one textile nonwoven layer (layer 1), preferably a spunbonded nonwoven layer, comprising synthetic polymer fibres wherein
  a1) textile nonwoven layer (layer 1), preferably the spunbonded nonwoven layer, has a weight per unit area of 50 to 500 g/m$^2$, preferably 80 to 300 g/m$^2$,
  a2) the fibres of the textile nonwoven layer (layer 1), preferably of the spunbonded nonwoven layer, have a diameter in the range of 0.7 to ≤6 dtex, preferably 1 to ≤4 dtex for polymer fibres,
  a3) textile nonwoven layer (layer 1) has no chemical binders and preferably is a spunbonded nonwoven,
  a4) the textile nonwoven layer (layer 1), preferably the spunbonded nonwoven layer was preferably compacted by means of a calendering to an air permeability of 500-2000 l/m$^2$ sec,
b) at least one further textile layer (layer 2) which is applied to at least one side of the textile nonwoven layer (layer 1) according to a), wherein the further textile nonwoven layer, is preferably a spunbonded nonwoven layer comprising synthetic polymer fibres, wherein
  b1) the further textile nonwoven layer (layer 2), preferably the spunbonded nonwoven layer, has a weight per unit area of 50-500 g/m$^2$, preferably 80 to 300 g/m$^2$,
  b2) the fibres of the further textile nonwoven layer (layer 2), preferably the spunbonded nonwoven layer have a diameter in the range of 3.0 to ≤15 dtex, preferably 4.0 to ≤12 dtex for polymer fibres,
  b3) the further textile nonwoven layer (layer 2) comprises no chemical binders and is preferably a spunbonded nonwoven
  b4) the air permeability of the further textile layer (layer 2) is greater than, preferably by at least 10%, than the air permeability of the textile nonwoven layer (layer 1),
  b5) the further textile nonwoven layer (layer 2), preferably the spunbonded nonwoven preferably has a gradient with regard to the fibre diameter which decreases in the direction of the textile nonwoven layer (layer 1),
c) wherein the textile nonwoven layer (layer 1) and the further textile nonwoven layer (layer 2) are joined to one another by mechanical needling and the diameter of the holes formed on the outer side of the textile nonwoven layer (layer 1) which faces away from the first textile nonwoven layer (layer 2) is reduced by means of action of a heated surface, preferably a calender, by at least 50%, preferably by at least 80%.

The filter medium according to the invention shows a sufficiently good separation of small particles without however having to have recourse to split fibres. The filter medium according to the invention is therefore characterised in that it comprises no split fibres.

Furthermore, the filter medium according to the invention shows a sufficiently good separation of small particles without having to have recourse to the combination of water jet needling and split fibres.

The layers of the filter medium according to the invention are therefore always joined to one another by means of mechanical needling but do not have the usual needle punch holes on the outer side of the textile nonwoven layer or a considerably reduced number and opening area (layer 1). The reduced number of holes can be identified in the product since the punch holes generated by the needling are still present on the other side of the filter medium.

The filter medium according to the invention is produced by means of known individual steps or methods familiar to the person skilled in the art. Suitable methods for forming nonwovens, in particular spunbonded nonwovens are disclosed, for example, in U.S. Pat. No. 5,993,501.

The filter medium according to the invention is preferably configured to be pleatable. To this end, the filter medium according to the invention can be combined with further known covering and carrier layers so that the pleatability is ensured. Preferably the filter medium according to the invention only consists of the textile nonwoven layer (layer 1) and the further textile nonwoven layer (layer 2).

Layer 1 of the filter medium according to the invention is produced by (1) forming the textile nonwoven layer (layer 1) or supplying the already-formed textile nonwoven layer (layer 1). The textile nonwoven layer (layer 1) is preferably present as roll goods.

After forming or supplying the textile nonwoven layer (layer 1), the further textile nonwoven layer (layer 2) is applied to this or formed on this. This is usually accomplished directly on the textile nonwoven layer (layer 1) by means of known nonwoven forming methods, preferably by forming spunbonded nonwoven or by supplying appropriate roll goods.

No chemical binders are used to produce the filter medium according to the invention.

The preferred areas for the materials involved are described in detail hereinafter and apply equally also to the method.

The textile nonwoven layer (layer 1) and the further textile nonwoven layer (layer 2) are joined to one another by means of mechanical needling. The needling is usually accomplished with needle densities of 20 to 100 punches/$cm^2$ The holes formed hereby on the outer side of the textile nonwoven layer (layer 1) facing away from the further textile nonwoven layer (layer 2) are reduced by means of the action of a heated surface, preferably by a calender.

To this end, the entire needled composite is guided through a thermal consolidation unit, preferably through a calender or calender furnace or calender drier. The calender usually has two rollers and the needled composite is guided through the roll gap. In this case, at least the roller of the calender which is in contact with the outer side of the textile nonwoven layer (layer 1) facing away from the further textile nonwoven layer (layer 2) and which has needle holes resulting from the needling is heated. Both rollers of the calender can be heated but preferably only the aforesaid roller.

The heated surface of the calender smooths the surface of the outer side of the textile nonwoven layer (layer 1) facing away from the further textile nonwoven layer (layer 2) from protruding fibres or fibre ends and brings about a partial or complete closure of the needle holes. The use of an S calender is particularly preferred.

The surface temperature of the heated surface is min. 10° C. below the melting point of the organic polymer fibres of the textile nonwoven layers.

Insofar as the textile nonwoven layers contain organic polymer fibres having different melting points, the surface temperature of the heated surfaces is min. 10° C. below the lowest melting point.

Insofar as the textile nonwoven layers have melt binder fibres and/or fibres having a minimum of one melt binder component, e.g. bicomponent fibres, the temperature of the heated surfaces is min. 10° C. below the lowest melting point of the melt binder fibres or melt binder components.

Insofar as the heated surface is provided in the form of a calender, the calender is driven with a gap, i.e. the two rollers of the calender have a preset distance which defines a gap. It is thereby ensured that a good surface contact of the needled composite with the heated surface of the calender is achieved. Furthermore, the entire needled composite can be compacted through the calender and the thickness reduced.

The pressure exerted by the calender ensures that the surfaces are in good contact with one another so that the smoothing of the surface and the reduction of the holes results. The intrinsic weight of the entire needled composite is not sufficient. Preferably with the aid of the calender driven with a gap, a thickness reduction of the entire needled composite of min. 5% but a maximum of 50% is achieved.

The contact time of the heated surface, preferably of the heated calender roller, with the outer side of the textile nonwoven layer (layer 1) is usually 1 second to 5 seconds.

Optionally the filter medium produced according to the invention can be subjected to a further additional surface treatment in which a reduction or elimination of fibres possibly protruding from the surface of the filter medium comes about. Suitable surface treatments are preferably thermal methods e.g. scorching, singeing or gassing. In addition to these thermal methods for surface treatments however, mechanical methods are also suitable for achieving a comparable effect. The treatment of the surface of the textile layer 2 is preferred in this case but a treatment of the surface of both textile layers 1 and 2 is also feasible. The treatment of the surfaces is preferably accomplished after the action of the heated surface, preferably after calendering, of the layer composite but said treatment is also possible after the needling of the layer composite and before the action of the heated surface or calendering. The filter material can alternatively also be supplied subsequently, i.e. off-line, as roll goods to an additional surface treatment step or the additional surface treatment step is carried out during manufacture, i.e. in-line.

The filter medium according to the invention thus has on the outer side of the textile nonwoven layer (layer 1) facing away from the further textile nonwoven layer (layer 2) a significantly reduced number of needle holes or needle holes having appreciably reduced hole diameter although the entire composite was needled beforehand. The needling can nevertheless be identified in the filter medium according to the invention since the other side of the filter medium still has the characteristic needling points.

DETAILED DESCRIPTION OF THE DRAWINGS

TEXTILE NONWOVEN LAYER (LAYER 1)

Figure 1:
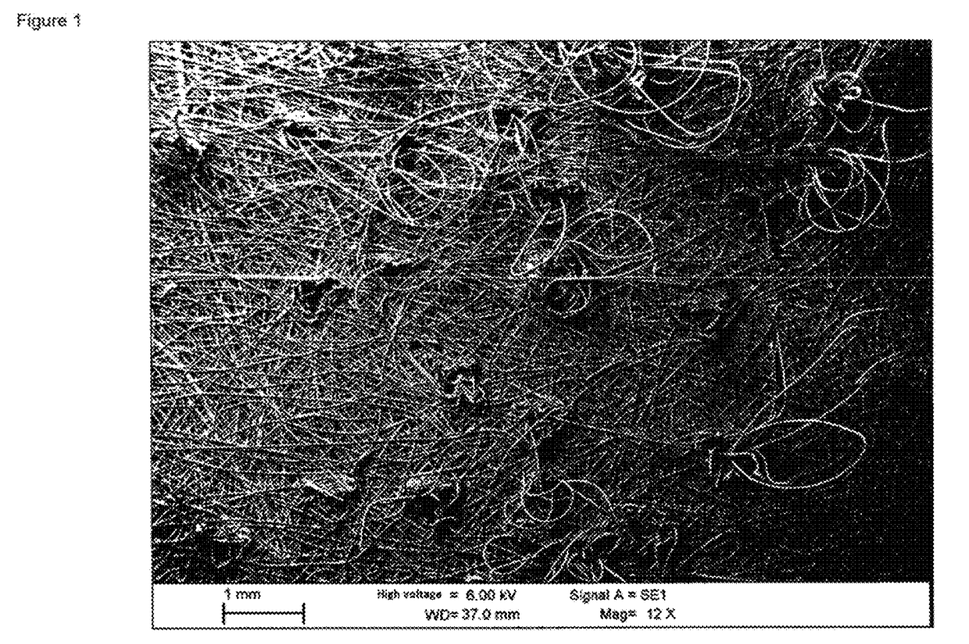
FIG. 1 shows a filter medium in which the textile nonwoven layer (layer 1) and the further textile nonwoven layer (layer 2) were needled to one another. The punch holes are clearly identifiable and significantly frayed.
Figure 2:
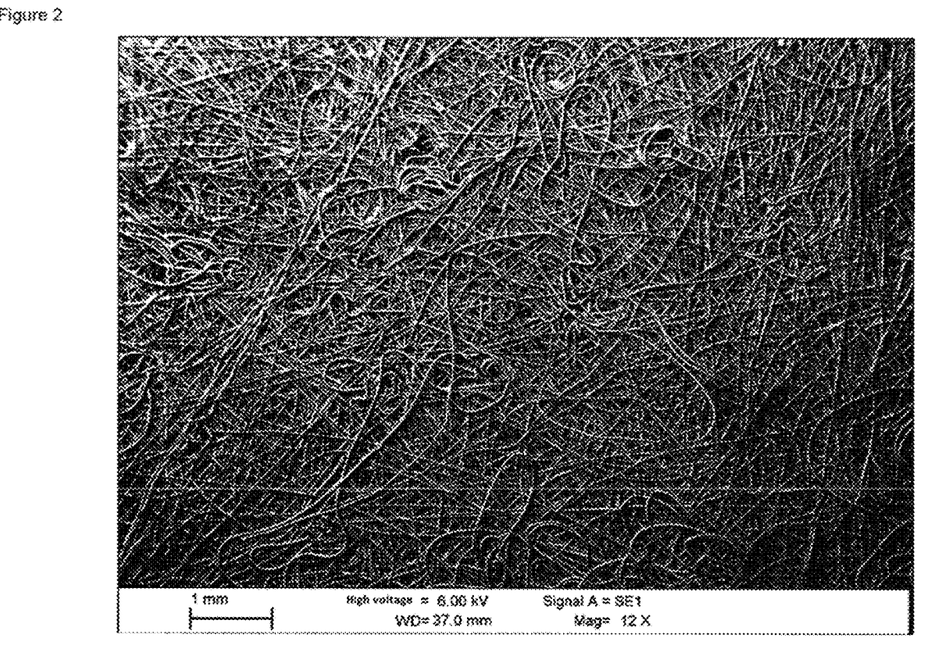
FIG. 2 shows a filter medium in which the textile nonwoven layer (layer 1) and the further textile nonwoven layer (layer 2) have been needled to one another and subjected to the aftertreatment according to the invention. The number of identifiable punch holes is reduced significantly and the surface has almost no protruding fibres or fibre ends. The size of the punch holes still present is significantly reduced.

Nonwovens of synthetic polymer fibres are used as textile nonwoven layer (layer 1), where the textile nonwoven layer can be formed from various synthetic polymer fibres. Preferably used are so-called bicomponent fibres (BiCo fibres).

Furthermore, the textile nonwoven layer (layer 1) can also be constructed as multilayer per se. In this case, the individual layers can differ in regard to the selected various synthetic polymer fibres and/or have different fibre diameters.

The nonwovens comprise staple fibre nonwovens, here in particular wet nonwovens as well as spun-bonded nonwovens or dry-laid nonwovens which are consolidated by means of thermal and/or mechanical consolidation but have no chemical binders.

The nonwovens preferably comprise spunbonded nonwovens of endless synthetic fibres. Spunbonded nonwovens, i.e. so-called spunbonds, are produced by a random deposition of freshly melt-spun filaments. The filaments are endless synthetic fibres of melt-spinnable polymer materials, in particular based on thermoplastics Suitable polymer materials are, for example, thermoplastics, preferably polyamides such as, for example, polyhexamethylene diadipamide, polycaprolactam, aromatic or partially aromatic polyamides ("aramids"), aliphatic polyamides such as, for example, Nylon, partially aromatic or fully aromatic polyesters, polycarbonate (PC), polyphenylene sulfide (PPS), polyphenylene oxide (PPO), polystyrene (PS), polyvinylcarbazole (PVK), polyacetal (POM), polyarylether, polyarylsulfone, polyethersulfone, polymers having ether and keto groups such as, for example, polyetherketone (PEK) and poly-etherether ketone (PEEK), polyolefins such as, for example, polyethylene or polypropylene or polybenzimidazole. Particularly preferred are polyesters, polyolefins such as, for example, polyethylene or polypropylene or aromatic or partially aromatic polyamides ("aramids"), aliphatic polyamides such as, for example, Nylon.

The spunbonded nonwovens preferably comprise or consist of melt-spinnable polyesters. In principle, all known types suitable for fibre production can be considered as polyester material. Such polyesters predominantly consist of building blocks which are derived from aromatic dicarboxylic acids and from aliphatic diols. Common aromatic dicarboxylic acid building blocks are the divalent radicals of benzene dicarboxylic acids, in particular of terephthalic acid and isophthalic acid; common diols have 2 to 4 C atoms, with ethylene glycol being particularly suitable. Spunbonded nonwovens consisting of at least 85 mol. % polyethylene terephthalate are particularly advantageous. The remaining 15 mol. % is then made up of dicarboxylic acid units and glycol units which act as so-called modifying agents and which enable the person skilled in the art to specifically influence the physical and chemical properties of the filaments produced. Examples for such dicarboxylic acid units are radicals of isophthalic acid or of aliphatic dicarboxylic acid such as, for example, glutaric acid, adipic acid, sebacic acid; examples of diol radicals having a modifying action are those of longer-chain diols, e.g. of propane diol or butane diol, of di- or triethylene glycol or, if present in small quantity, of polyglycol having a molecular weight of about 500 to 2000.

Particularly preferred are polyesters containing at least 95 mol % polyethylene terephthalate (PET), particularly those comprising unmodified PET.

The polyesters contained in the spun-bonded nonwovens preferably have a molecular weight corresponding to an intrinsic viscosity (IV) measured in a solution of 1 g polymer in 100 ml dichloroacetic acid at 25° C., of 0.6 to 1.4.

In a further preferred embodiment of the invention, the nonwoven, in particular the spunbonded nonwoven, is a melt-binder-consolidated nonwoven, in particular based on bicomponent fibres, i.e. the consolidation is accomplished by means of a thermoplastic binder which is preferably present in fibre form or as a fibre component. The melt-binder-consolidated nonwoven therefore comprises carrier and hot-melt adhesive fibres and/or bicomponent fibres having carrier and binder components. The carrier and hot-melt adhesive fibres or components can be derived from any thermoplastic fibre-forming polymers and carrier fibres can furthermore also be derived from non-melting fibre-forming polymers. Such melt-binder consolidated spun-bonded nonwovens are described, for example, in principle in EP-A-0,446,822 and EP-A-0,590,629.

Examples for polymers from which the carrier fibres or carrier fibre components can be derived are polyacrylonitrile, polyolefins such as polyethylene or polypropylene, substantially aliphatic polyamides such as Nylon 6.6, substantially aromatic polyamides (aramids) such as poly-(p-phenylene terephthalate) or copolymers containing a fraction of aromatic m-diamine units for improving the solubility or poly-(m-phenylene isophthalate), substantially aromatic polyesters such as poly-(p-hydroxybenzoate) or preferably substantially aliphatic polyesters such as polyethylene terephthalate.

The proportion of the two fibre types to one another can be selected within wide limits where it should be noted that the fraction of the hot-melt adhesive fibres is selected to be sufficiently high that due to adhesive bonding of the carrier fibres to the hot-melt adhesive fibres, the nonwoven acquires a sufficient strength for the desired application but on the other hand the required air permeability is ensured. The fraction of the hot-melt adhesive coming from the hot-melt adhesive fibres in the nonwoven is usually less than 50 wt. % (relative to the weight of the nonwoven).

In particular, modified polyesters having a melting point reduced by 10 to 50° C., preferably by 30 to 50° C. with respect to the nonwoven raw material come into consideration as hot-melt adhesives. Examples of such hot-melt adhesives are polypropylene, polybutylene terephthalate or polyethylene terephthalate modified by condensation of longer-chain diols and/or of isophthalic acid or aliphatic dicarboxylic acids.

The hot-melt adhesives are preferably introduced into the nonwovens in fibre form or in the form of so-called bicomponent fibres, wherein the previously designated materials for the carrier fibres form the mechanical strength and the previously designated materials for the hot-melt adhesive fibres form the second component of the bicomponent fibres which is used for the consolidation.

Preferably carrier and hot-melt adhesive fibres are constructed from one polymer class. By this it should be understood that all the fibres used are selected from one substance class so that these can easily be recycled after use of the nonwoven. If the carrier fibres, for example, consist of polyesters, the hot-melt adhesive fibres will also be selected from polyesters or from a mixture of polyesters, e.g. as bicomponent fibres with PET in the core and a lower-melting polyethylene terephthalate copolymer as cladding; furthermore however bicomponent fibres constructed from different polymers are also possible. Examples for this are bicomponent fibres of polyester and polyamide (core/cladding).

The single fibre titre of the carrier and the hot-melt adhesive fibres can be selected within the said limits.

The fibres making up the nonwovens can have an almost round cross-section or also other shapes such as dumbbell-shaped, kidney-shaped, triangular or tri- or multilobal cross-sections. Hollow fibres and bi- or multicomponent fibres can also be used. Furthermore the hot-melt adhesive fibres or hot-melt adhesive component can also be used in the form of bi- or multicomponent fibres.

The fibres forming the nonwoven can be modified by usual additives, for example, by antistatics such as soot or additives which enable an electrostatic charging. Furthermore, the fibres can have an antimicrobial finish.

The synthetic polymer fibres forming the nonwoven preferably comprise no staple fibres and/or so-called melt-blown fibres of synthetic polymer materials.

In addition to the said synthetic polymer fibres, additional glass fibres can also be present so that a mixture of glass and/or mineral fibres and synthetic polymer fibres is present as nonwoven-forming fibres.

Instead of glass fibres, it is also possible to use mineral fibres based on alumosilicate, ceramic, dolomite fibres or fibres of vulcanites such as, for example, basalt diabase, melaphyre. Diabase (green stone) and melaphyre (so-called paleobasalts) can also be used.

Among the glass fibres, the glass fibres used are not subject to any substantial restriction in regard to glass type so that in principle all glass types such as E glass, S glass, R glass and C glass can be used. For economic reasons E glass or C glass is preferred. Biosoluble glasses are particularly preferred.

The glass fibres can be formed from filaments, i.e. infinitely long fibres or from staple fibres, the latter being preferred. The average length of the staple fibres is between 3 and 100 mm, preferably 6 to 18 mm. The staple fibres can also have different lengths.

The diameter of the glass fibres lies between 0.5-15 µm, preferably 8 to 15 µm.

The fraction of glass fibres in the textile nonwoven layer (layer 1) is up to max. 50 wt. %, preferably up to max. 30 wt. %, particularly preferably up to max. 10 wt. %.

The weight per unit area of the textile nonwoven layer (layer 1) is between 50 and 500 $g/m^2$, preferably 80 and 300 $g/m^2$, in particular 100 and 250 $g/m^2$.

As already mentioned, the nonwovens comprise those which are consolidated by means of thermal and/or mechanical consolidation but which have no chemical binders. This consolidation is preferably accomplished by means of calendering with the result that the air permeability of 500 to 2000 $l/m^2$ sec is set.

In a preferred embodiment of the invention, the textile nonwoven layer (layer 1), preferably the spunbonded nonwoven after consolidation by means of a calender has a smooth or linen embossing.

Further Textile Nonwoven Layer (Layer 2)

Nonwovens of synthetic polymer fibres are used or produced on the textile nonwoven layer (layer 1) as further textile nonwoven layer (layer 2).

The further textile nonwoven layer (layer 2) preferably has a gradient with regard to the fibre diameter which decreases in the direction of the textile nonwoven layer (layer 1). This gradient is produced by various synthetic polymer fibres having different fibre diameters.

The further textile nonwoven layer (layer 2) preferably comprises staple fibre nonwovens, here in particular wet nonwovens as well as spunbonded nonwovens or dry-laid nonwovens, but preferably spunbonded nonwovens of endless synthetic fibres. Spunbonded nonwovens, i.e. so-called spunbonds are produced by random deposition of freshly melt-spun filaments. The filaments are endless synthetic fibres of melt-spinnable polymer materials.

Due to the manufacture, e.g. in the case of spunbonded nonwovens, the previously designated gradient can also be produced by a multilayer structure per se.

In this case, the individual layers differ in regard to the selected fibre diameters and possibly also by use of various synthetic polymer fibres.

The further textile nonwoven layer (layer 2) has no chemical binders.

Suitable polymer materials for the further textile nonwoven layer (layer 2), in particular for spunbonded nonwovens are, for example, thermoplastics, preferably polyamides such as, for example, polyhexamethylene diadipamide, polycaprolactam, aromatic or partially aromatic polyamides ("aramids"), aliphatic polyamides such as, for example, Nylon, partially aromatic or fully aromatic polyesters, polycarbonate (PC), polyphenylene sulfide (PPS), polyphenylene oxide (PPO), polystyrene (PS), polyvinylcarbazole (PVK), polyacetal (POM), polyarylether, polyarylsulfone, polyethersulfone, polymers having ether and keto groups such as, for example, polyetherketone (PEK) and polyetherether ketone (PEEK), polyolefins such as, for example, polyethylene or polypropylene or polybenzimidazole. Particularly preferred are polyesters, polyolefins such as, for example, polyethylene or polypropylene or aromatic or partially aromatic polyamides ("aramids"), aliphatic polyamides such as, for example, Nylon.

The spunbonded nonwovens preferably comprise or consist of melt-spinnable polyesters. In principle, all known types suitable for fibre production can be considered as polyester material. Such polyesters predominantly consist of building blocks which are derived from aromatic dicarboxylic acids and from aliphatic diols. Common aromatic dicarboxylic acid building blocks are the divalent radicals of benzene dicarboxylic acids, in particular of terephthalic acid and isophthalic acid; common diols have 2 to 4 C atoms, with ethylene glycol being particularly suitable. Spunbonded nonwovens consisting of at least 85 mol % polyethylene terephthalate are particularly advantageous. The remaining 15 mol. % is then made up of dicarboxylic acid units and glycol units which act as so-called modifying agents and which enable the person skilled in the art to specifically influence the physical and chemical properties of the filaments produced. Examples for such dicarboxylic acid units are radicals of isophthalic acid or of aliphatic dicarboxylic acid such as, for example, glutaric acid, adipic acid, sebacic acid; examples of diol radicals having a modifying action are those of longer-chain diols, e.g. of propane diol or butane diol, of di- or triethylene glycol or, if present in small quantity, of polyglycol having a molecular weight of about 500 to 2000.

Particularly preferred are polyesters containing at least 95 mol % polyethylene terephthalate (PET), particularly those comprising unmodified PET.

The polyesters contained in the spun-bonded nonwovens preferably have a molecular weight corresponding to an intrinsic viscosity (IV), measured in a solution of 1 g polymer in 100 ml dichloroacetic acid at 25° C., of 0.6 to 1.4.

In a further preferred embodiment of the invention, the nonwoven, in particular the spunbonded nonwoven, is a melt-binder-consolidated nonwoven, in particular based on bicomponent fibres, i.e. the consolidation is accomplished by means of a thermoplastic binder which is preferably present in fibre form or as a fibre component. The melt-binder-consolidated nonwoven therefore comprises carrier and hot-melt adhesive fibres and/or bicomponent fibres having carrier and binder components. The carrier and hot-melt adhesive fibres or components can be derived from any thermoplastic fibre-forming polymers and carrier fibres can furthermore also be derived from non-melting fibre-forming polymers. Such melt-binder consolidated spun-bonded nonwovens are described, for example, in principle in EP-A-0,446,822 and EP-A-0,590,629.

Examples for polymers from which the carrier fibres or carrier fibre components can be derived are polyacrylonitrile, polyolefins such as polyethylene or polypropylene, substantially aliphatic polyamides such as Nylon 6.6, substantially aromatic polyamides (aramids) such as poly-(p-phenylene terephthalate) or copolymers containing a fraction of aromatic m-diamine units for improving the solubility or poly-(m-phenylene isophthalate), substantially aromatic polyesters such as poly-(p-hydroxybenzoate) or preferably substantially aliphatic polyesters such as polyethylene terephthalate.

The proportion of the two fibre types to one another can be selected within wide limits where it should be noted that the fraction of the hot-melt adhesive fibres is selected to be sufficiently high that due to adhesive bonding of the carrier fibres to the hot-melt adhesive fibres, the nonwoven acquires a sufficient strength for the desired application but on the other hand the required air permeability is ensured. The fraction of the hot-melt adhesive coming from the hot-melt adhesive fibres in the nonwoven is usually less than 50 wt. % (relative to the weight of the nonwoven).

In particular modified polyesters having a melting point reduced by 10 to 50° C., preferably by 30 to 50° C. with respect to the nonwoven raw material come into consideration as hot-melt adhesives. Examples of such hot-melt adhesives are polypropylene, polybutylene terephthalate or polyethylene terephthalate modified by condensation of longer-chain diols and/or of isophthalic acid or aliphatic dicarboxylic acids.

The hot-melt adhesives are preferably introduced into the nonwovens in fibre form or in the form of so-called bicomponent fibres, wherein the previously designated materials for the carrier fibres form the mechanical strength and the previously designated materials for the hot-melt adhesive fibres form the second component of the bicomponent fibres which is used for the consolidation.

Preferably carrier and hot-melt adhesive fibres or carrier fibre and hot-melt adhesive fibre components are constructed from one polymer class. By this it should be understood that all the fibres used are selected from one substance class so that these can easily be recycled after use of the nonwoven. If the carrier fibres, for example, consist of polyesters, the hot-melt adhesive fibres will also be selected from polyesters or from a mixture of polyesters, e.g. as bicomponent fibres with PET in the core and a lower-melting polyethylene terephthalate copolymer as cladding; furthermore however bicomponent fibres constructed from different polymers are also possible. Examples for this are bicomponent fibres of polyester and polyamide (core/cladding).

The single fibre titre of the carrier and the hot-melt adhesive fibres can be selected within the said limits.

The fibres making up the nonwovens can have an almost round cross-section or also other shapes such as dumbbell-shaped, kidney-shaped, triangular or tri- or multilobal cross-sections. Hollow fibres and bi- or multicomponent fibres can also be used.

Furthermore the hot-melt adhesive fibres or hot-melt adhesive component can also be used in the form of bi- or multicomponent fibres.

The fibres forming the nonwoven can be modified by usual additives, for example, by antistatics such as soot or additives which enable an electrostatic charging. Furthermore, the fibres can have an antimicrobial finish.

The synthetic polymer fibres forming the nonwoven preferably comprise no staple fibres and/or so-called melt-blown fibres of synthetic polymer materials.

In addition to the said synthetic polymer fibres, additional glass fibres can also be present so that a mixture of glass and/or mineral fibres and synthetic polymer fibres is present as nonwoven-forming fibres.

Instead of glass fibres, it is also possible to use mineral fibres based on alumosilicate, ceramic, dolomite fibres or fibres of vulcanites such as, for example, basalt diabase, melaphyre. Diabase (green stone) and melaphyre (so-called paleobasalts) can also be used. Glass fibres are preferred however as a result of their economic availability.

Among the glass fibres, the glass fibres used are not subject to any substantial restriction in regard to glass type so that in principle all glass types such as E glass, S glass, R glass and C glass can be used. For economic reasons E glass or C glass is preferred. Biosoluble glasses are particularly preferred.

The glass fibres can be formed from filaments, i.e. infinitely long fibres or from staple fibres, the latter being preferred. The average length of the staple fibres is between 3 and 100 mm, preferably 6 to 18 mm. The staple fibres can also have different lengths.

The diameter of the glass fibres lies between 0.5-15 μm, preferably 8 to 15 μm.

The fraction of glass fibres in the textile nonwoven layer (layer 2) is up to max. 50 wt. %, preferably up to max. 30 wt. %, particularly preferably up to max. 10 wt. %.

The weight per unit area of the textile nonwoven layer (layer 1) is between 50 and 500 g/m$^2$, preferably 80 and 300 g/m$^2$, in particular 100 and 250 g/m$^2$.

The further textile nonwoven layer (layer 2) has a higher air permeability than the air permeability of the textile nonwoven layer (layer 1), this is preferably at least 10% higher, particularly preferably at least 50%. The air permeability of the further textile nonwoven layer (layer 2) is therefore preferably between 550-2200 l/m$^2$ sec.

The diameters of the fibres of the further textile nonwoven layer (layer 20 are preferably greater than the diameter of the fibres of the textile nonwoven layer (layer 1), particularly preferably by at least 10%.

As already stated, the textile nonwoven layer (layer 1) and the further textile nonwoven layer (layer 2) are joined to one another by means of mechanical needling. As a result of the preceding method, holes are obtained at the punch points of the needles on the outer side of the textile nonwoven layer (layer 1) facing away from the further textile nonwoven layer (layer 2). These holes are, as already set out, appreciably reduced (number and size) or eliminated by means of the action of a heated surface, e.g. calender, on the layer side 1.

The filter medium according to the invention is used in air/gas and liquid filtration, in particular in the automobile sector, in air-conditioning systems, interior filters, pollen filters, clean room filters, domestic filters and as oil filters and hydraulic filters. Preferably the filter medium is used for engine air intake filters which require a very good degree of separation.

The filter medium according to the invention has a degree of separation of more than 99%, preferably more than 99.3%, in particular more than 99.5%, particularly preferably min. 99.8%.

The subject matter of the present invention is therefore also filters, filter modules or cartridges which contain the filter medium according to the invention. Here the filters, optionally in pleated form are installed in housings or other enclosures. Corresponding configurations can be deduced, for example, from U.S. Pat. No. 5,883,501.

General Measurement Methods:

Separation Efficiency:

The separation efficiency is tested by means of a filter test rig from Palas (Model MFP 2000) using ISO fine test dust (ISO 12103-1). The measurement is made at a flow rate of 0.33 m/s up to a final differential pressure of 2000 Pa.

Dust Capacity:

The dust capacity was tested by means of a filter test rig from Palas (Model MFP 2000) using ISO fine test dust (ISO 12103-1). The measurement is made at a flow rate of 0.33 m/s up to a final differential pressure of 2000 Pa.

Air Permeability:

The air permeability is determined in accordance with DIN EN ISO 9237.

Weight Per Unit Area:

The weight per unit area is determined in accordance with DIN EN ISO 29073-1.

Determination of Nonwoven Thickness:

The thickness is determined in accordance with DIN EN ISO 9073-2.

Measurement of Fibre Diameter:

The fibre diameter is determined in accordance with DIN EN ISO 1973 (as of 1995).

The present invention is explained by means of the following examples without however being restricted to these.

EXAMPLE

A textile spunbonded nonwoven layer (layer 1) based on bicomponent fibres (PET/mod. PET) having a titre of 1.7 dtex and a weight per unit area of 150 g/m² and a further textile spunbonded nonwoven layer (layer 2) based on polyethylene terephthalate fibres (PET) having a titre gradient of 9.9 dtex and 5.6 dtex and having a weight per unit area of 160 g/m² are supplied and needled to one another. The needle density is 41 punches/cm². The needled composite is then supplied to a calender having two rollers, the calender gap is 1.4 mm. After the calender treatment the final composite has a thickness of 2.5 mm.

The surface temperature of roller 1 of the calender, i.e. the roller which is in contact with the outer side of the textile nonwoven layer (layer 1) facing away from the further textile nonwoven layer (layer 2) is 210° C., the surface temperature of the opposite roller 2 is 70° C.

The filter medium according to the invention is then tested with a filter test rig from Palas (Model MFP 2000) using ISO fine test dust (ISO 12103-1).

The filter medium produced according to the invention was tested at a flow rate of 0.33 m/s up to a final differential pressure of 2000 Pa.

The filter medium produced according to the invention showed an average mass-related separation efficiency of 99.8%, the specific dust capacity is 830 g/m².

The filter medium produced according to the invention is compared with a filter medium having an identical structure which however was produced without the thermal treatment by a calender according to the invention. The specific dust capacity was 980 g/m² but the separation efficiency is only 99% as compared with 99.8% for the product according to the invention. The product not according to the invention therefore has a permeability a factor of 5 higher (permeability 1% vs. 0.2%).

The filter medium produced according to the invention shows a significantly improved separation efficiency with only moderately reduced specific dust capacity.

The invention claimed is:

1. A filter medium comprising:
   a prefabricated first layer, wherein the prefabricated first layer comprises a first spunbonded nonwoven layer comprising synthetic polymer fibres;
      wherein the prefabricated first layer has a weight per unit area of 50 to 500 g/m²;
      wherein the synthetic polymer fibres of the prefabricated first layer have a linear density in the range of 0.7 to ≤6 dtex;
      wherein the synthetic polymer fibres of the prefabricated first layer comprise a polyester;
      wherein the prefabricated first layer has no chemical binders;
      wherein the prefabricated first layer has an air permeability of 500-2000 l/m² sec; and
      the prefabricated first layer comprises a linen embossing;
   a prefabricated second layer which is applied to at least one side of the prefabricated first layer, wherein the prefabricated second layer comprises a second spunbonded nonwoven layer of synthetic polymer fibres;
      wherein the prefabricated second layer has a weight per unit area of 50-500 g/m²;
      wherein the synthetic polymer fibres of the prefabricated second layer have a linear density in the range of 3.0 to ≤15 dtex;
      wherein the synthetic polymer fibres of the prefabricated second layer have a diameter that is at least 10% greater than the synthetic polymer fibres of the prefabricated first layer;
      wherein the prefabricated second layer has no chemical binders;
      wherein the air permeability of the prefabricated second layer is greater than the air permeability of the prefabricated first layer;
      wherein one of the prefabricated first layer and the prefabricated second layer is consolidated using mechanical consolidation but not thermal consolidation and the other of the prefabricated first layer and the prefabricated second layer is thermally consolidated;
      wherein fibres of one or both of the prefabricated first layer and the prefabricated second layer comprise an antimicrobial finish;
      wherein the prefabricated first layer and the prefabricated second layer are coupled together by using mechanical needling of 20 to 100 punches per cm² using punches that produce holes having diameters in the prefabricated first and second layers; and
   wherein at least some of the holes formed on an outer side of the prefabricated first layer that faces away from the prefabricated second layer by the mechanical needling are fully closed.

2. The filter medium according to claim 1, wherein the prefabricated first layer and the prefabricated second layer do not contain split fibres.

3. The filter medium according to claim 1, wherein the filter medium consists only of the prefabricated first layer and the prefabricated second layer.

4. The filter medium according to claim 1, wherein the prefabricated first and second layers consist of synthetic polymer fibres.

5. The filter medium according to claim 4, wherein the prefabricated first and second layers consist of bicomponent fibres.

6. The filter medium according to claim 1, wherein the prefabricated first and second layers comprise a respective first and second plurality of layers.

7. The filter medium according to claim 1, wherein the prefabricated first and second layers comprise thermoplastics.

8. The filter medium according to claim 1, comprising additives that reduce static or additives that enable electrostatic charging.

9. The filter medium according to claim 1, wherein the prefabricated first and second layers have no staple fibres and/or melt-blown fibres made of synthetic polymer materials.

10. The filter medium according to claim 1, wherein at least one of the prefabricated first and second layers comprises at least one of glass or mineral fibres.

11. The filter medium according to claim 1, comprising a housing.

12. The filter medium according to claim 1, wherein:
at least one surface of the filter medium comprises no fibres protruding from the at least one surface.

13. The filter medium according to claim 1, wherein:
the air permeability of the prefabricated second layer is between 550 and 2200 l/m² s.

14. The filter medium according to claim 1, wherein:
the polyester comprises polyethylene terephthalate.

15. The filter medium according to claim 1, wherein:
the synthetic polymer fibres of one or both of the prefabricated first layer and the prefabricated second layer comprise bicomponent fibres having a first component of polyethylene terephthalate and a second component of modified polyethylene terephthalate.

16. A filter medium comprising:
a prefabricated first layer, wherein:
  the prefabricated first layer comprises a first spunbonded nonwoven layer comprising synthetic polymer fibres;
  the prefabricated first layer has a weight per unit area of 50 to 500 g/m²;
  the synthetic polymer fibres of the prefabricated first layer have a linear density in the range of 0.7 to ≤6 dtex;
  the prefabricated first layer has no chemical binders;
  the prefabricated first layer has an air permeability of 500-2000 l/m² sec; and
  the prefabricated first layer comprises a linen embossing;
a prefabricated second layer which is applied to at least one side of the prefabricated first layer, wherein:
  the prefabricated second layer comprises a second spunbonded nonwoven layer of synthetic polymer fibres;
  the prefabricated second layer has a weight per unit area of 50-500 g/m²;
  the synthetic polymer fibres of the prefabricated second layer have a linear density in the range of 3.0 to ≤15 dtex;
  the synthetic polymer fibres of the prefabricated second layer have a diameter that is at least 10% greater than the synthetic polymer fibres of the prefabricated first layer;
  the prefabricated second layer has no chemical binders;
  the air permeability of the prefabricated second layer is greater than the air permeability of the prefabricated first layer;
  one of the prefabricated first layer and the prefabricated second layer is consolidated using mechanical consolidation but not thermal consolidation and the other of the prefabricated first layer and the prefabricated second layer is thermally consolidated;
  the prefabricated first layer and the prefabricated second layer are coupled together by using mechanical needling of 20 to 100 punches per cm² using punches that produce holes having diameters in the prefabricated first and second layers; and
  at least some of the holes formed on an outer side of the prefabricated first layer that faces away from the prefabricated second layer by the mechanical needling are fully closed.

17. A filter medium comprising:
a prefabricated first layer, wherein:
  the prefabricated first layer comprises a first spunbonded nonwoven layer comprising synthetic polymer fibres;
  the prefabricated first layer has a weight per unit area of 50 to 500 g/m²;
  the synthetic polymer fibres of the prefabricated first layer have a linear density in the range of 0.7 to ≤6 dtex;
  the prefabricated first layer has no chemical binders; and
  the prefabricated first layer has an air permeability of 500-2000 l/m² sec;
a prefabricated second layer which is applied to at least one side of the prefabricated first layer, wherein:
  the prefabricated second layer comprises a second spunbonded nonwoven layer of synthetic polymer fibres;
  the prefabricated second layer has a weight per unit area of 50-500 g/m²;
  the synthetic polymer fibres of the prefabricated second layer have a linear density in the range of 3.0 to ≤15 dtex;
  the synthetic polymer fibres of the prefabricated second layer have a diameter that is at least 10% greater than the synthetic polymer fibres of the prefabricated first layer;
  the prefabricated second layer has no chemical binders;
  the air permeability of the prefabricated second layer is greater than the air permeability of the prefabricated first layer;
  one of the prefabricated first layer and the prefabricated second layer is consolidated using mechanical consolidation but not thermal consolidation and the other of the prefabricated first layer and the prefabricated second layer is thermally consolidated;
  fibres of one or both of the prefabricated first layer and the prefabricated second layer comprise an antimicrobial finish;
  the prefabricated first layer and the prefabricated second layer are coupled together by using mechanical needling of 20 to 100 punches per cm² using punches that produce holes having diameters in the prefabricated first and second layers; and
  at least some of the holes formed on an outer side of the prefabricated first layer that faces away from the prefabricated second layer by the mechanical needling are fully closed.

* * * * *